US011805583B2

(12) United States Patent
     Zhang

(10) Patent No.: US 11,805,583 B2
(45) Date of Patent: Oct. 31, 2023

(54) LIGHT EMITTING DIODE LIGHT SYSTEM

(71) Applicant: Verdant Lighting Technology, Inc., Cypress, TX (US)

(72) Inventor: Qian Zhang, Cypress, TX (US)

(73) Assignee: Verdant Lighting Technology, Inc., Cypress, TX (US)

( * ) Notice: Subject to any disclaimer, the term of this patent is extended or adjusted under 35 U.S.C. 154(b) by 236 days.

(21) Appl. No.: 16/607,039

(22) PCT Filed: Apr. 20, 2018

(86) PCT No.: PCT/US2018/028648
    § 371 (c)(1),
    (2) Date: Oct. 21, 2019

(87) PCT Pub. No.: WO2018/195479
    PCT Pub. Date: Oct. 25, 2018

(65) Prior Publication Data
    US 2020/0053845 A1    Feb. 13, 2020

Related U.S. Application Data

(60) Provisional application No. 62/488,607, filed on Apr. 21, 2017, provisional application No. 62/488,621, (Continued)

(51) Int. Cl.
    *H05B 45/20*    (2020.01)
    *F21S 10/02*    (2006.01)
    (Continued)

(52) U.S. Cl.
    CPC ............. *H05B 45/20* (2020.01); *F21S 10/02* (2013.01); *H05B 47/19* (2020.01); *F21W 2131/109* (2013.01)

(58) Field of Classification Search
    CPC ......... H05B 45/20; H05B 47/19; F21S 10/02; F21W 2131/109
    (Continued)

(56) References Cited

U.S. PATENT DOCUMENTS 4,030,118 A   6/1977   Dischert
7,394,210 B2  7/2008   Ashdown
              (Continued)

FOREIGN PATENT DOCUMENTS

CN   101828072 A   9/2010
CN   102630511 A   8/2012
              (Continued)

OTHER PUBLICATIONS

First Office Action, CN Application No. 2018800407993, dated Apr. 6, 2021, 10 pages.
(Continued)

*Primary Examiner* — Elmito Breval
*Assistant Examiner* — Hana S Featherly
(74) *Attorney, Agent, or Firm* — Polsinelli PC

(57) ABSTRACT

Lighting system having a plurality light emitting diodes, wherein each of the light emitting diodes is configured to output light in a predetermined color bands and is arranged in a corresponding group according to the predetermined color bands. A plurality of power output controllers, each of the plurality of power output controllers configured to output a predetermined power level to the corresponding group of light emitting diodes and a master controller coupled to the plurality of output controllers and operable to synchronize the plurality of output controllers. The master controller operable to receive data from a remote device indicating a desired duty cycle, cycle period, and phase shift of the output power relative to one another.

20 Claims, 14 Drawing Sheets

Related U.S. Application Data filed on Apr. 21, 2017, provisional application No. 62/488,622, filed on Apr. 21, 2017.

(51) Int. Cl.
*H05B 47/19* (2020.01)
*F21W 131/109* (2006.01)

(58) Field of Classification Search
USPC .......................................................... 362/563
See application file for complete search history.

(56) References Cited

U.S. PATENT DOCUMENTS

| | | | |
|---|---|---|---|
| 8,427,311 B2 | 4/2013 | Schlangen et al. | |
| 9,609,859 B2 | 4/2017 | Stowe et al. | |
| 2002/0119279 A1* | 8/2002 | Ogawa | B82Y 30/00 |
| 2006/0082331 A1* | 4/2006 | Ashdown | H05B 45/20 |
| | | | 315/291 |
| 2011/0267375 A1* | 11/2011 | Yang | G09G 3/3406 |
| | | | 315/307 |
| 2015/0305258 A1* | 10/2015 | Broutin Farah | A01G 31/02 |
| | | | 700/90 |
| 2016/0255687 A1 | 9/2016 | Zhang et al. | |

FOREIGN PATENT DOCUMENTS

| | | |
|---|---|---|
| CN | 103493590 A | 1/2014 |
| CN | 204145846 U | 2/2015 |
| CN | 204362361 U | 5/2015 |
| JP | 2000-228291 A | 8/2000 |
| JP | 2014-171465 A | 9/2014 |
| JP | 2016-527655 A | 3/2017 |
| JP | 2016-202125 A | 2/2019 |
| KR | 20140049260 A | 4/2014 |
| WO | 2016051207 A2 | 4/2016 |
| WO | 2012140634 A1 | 10/2021 |

OTHER PUBLICATIONS

International Search Report; PCT Application No. PCT/US2018/028648; dated Jul. 16, 2018.
Written Opinion of PCT Application No. PCT/US2018/028648; dated Jul. 16, 2018.
English Language Abstract of CN204362361; Retreived From www.espacenet.com on Oct. 21, 2019.
Electromagnetic Spectrum. GSP 216 Introduction to Remote Sensing. 2015. [Retreived Jun. 18, 2018], Retreived From Internet: <http://gsp.humboldt.edu/olm_2015/courses/gsp_216_online/lesson1-2/spectrum.html> Entire Document.
Second Office Action, CN Application No. 2018800407993, dated Dec. 13, 2021, 8 pages.
Machine Translation of CN Application No. 102630511, dated Jan. 14, 2022, 5 pages.
Machine Translation of CN Application No. 204145846, dated Jan. 14, 2022, 7 pages.
Machine Translation of JP Application No. 2016-527655, dated Apr. 14, 2022, 12 pages.
Machine Translation of JP Application No. 2014-171465, dated Apr. 14, 2022, 7 pages.
Machine Translation of JP Application No. 2000-228291, dated Apr. 14, 2022, 7 pages.
Machine Translation of JP Application No. 2016-202125, dated Apr. 14, 2022, 7 pages.
Notification of Reasons for Refusal in related JP Application No. 2020-507505, dated Apr. 12, 2022.
Machine Translation of KR Application No. 20140049260, 7 pages.
Office Action in related EP Application No. 18786982.1, dated Nov. 3, 2022, 7 pages.
Office Action in related KR Application No. 10-2019-7034378, dated Oct. 18, 2022, 6 pages.
Machine Translation of KR Application No. 20140049260, dated Feb. 28, 2023, 15 pages.

* cited by examiner

LIGHT EMITTING DIODE LIGHT SYSTEM

CROSS-REFERENCE TO RELATED APPLICATIONS

This application is a national stage entry of PCT/US2018/028648 filed Apr. 20, 2018, which claims priority from U.S. patent applications 62/488,607, 62/488,621 and 62/488,622 filed on Apr. 21, 2017, the contents of each are hereby incorporated by reference in their entirety.

FIELD

The present disclosure relates generally to a light emitting diode (LED) light stack. In particular, the subject matter herein generally relates to a light stack having one or more lighting systems.

BACKGROUND

Light stack assemblies and system are implemented with a plurality of light sources between an on and an off position. The light stack assemblies have a single power draw setting and cannot be adjusted to reduce energy consumption throughout a life cycle use. Light stacks can be implemented within homes, businesses, or any other environment, but often are energy inefficient due to unnecessary light output during certain times.

BRIEF DESCRIPTION OF THE DRAWINGS

Implementations of the present technology will now be described, by way of example only, with reference to the attached figures, wherein.

DETAILED DESCRIPTION

Figure 1:
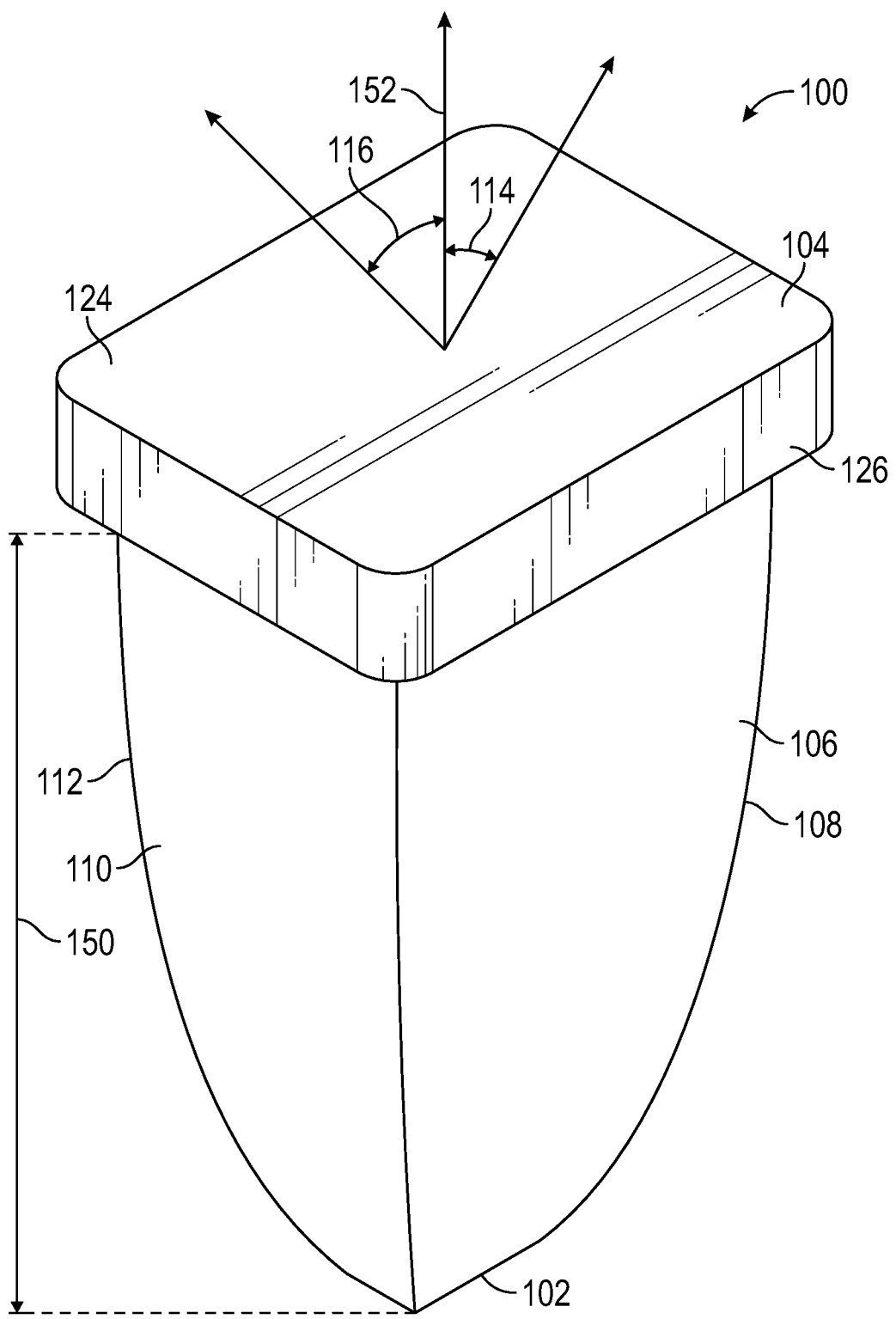
FIG. 1 is an isometric view of a multi-angle lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the example described herein. However, it will be understood by those of ordinary skill in the art that the example described herein can be practiced without these specific details. In other examples, methods, procedures and components have not been described in detail so as not to obscure the related relevant feature being described. Also, the description is not to be considered as limiting the scope of the example described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" means almost, nearly, on the verge of, or without significant deviation from the numeric representation. The term "comprising" means "including, but not necessarily limited to"; it specifically indicates open-ended inclusion or membership in a so-described combination, group, series and the like.

The term "light source" or "light array" is defined to include any element capable of producing light (visible or invisible to the human eye) including, but not limited to, light emitting diode (LED), compact fluorescent light (CFL), fluorescent, incandescent, and infrared.

The present disclosure is drawn to a light stack assembly having an elongate body having a length extending from a proximal end to a distal end of the elongate body. A plurality of LED arrays can be coupled with the elongate body and arranged along the length thereof. A control module can be coupled with the plurality of LED arrays. The control module can be configured to individually transition each of the plurality of LED arrays between a light emitting condition and a non-light emitting condition.

The control module can transition the plurality of LED arrays between the light emitting condition and the non-light emitting condition, whereby the LED array of the plurality of LED arrays adjacent to the proximal end is in a light emitting condition prior to an LED array toward the distal end. The control module can transition a corresponding one of the plurality of LED arrays to a light emitting condition based upon a command received from an external source.

The light stack assembly can further include a plurality of proximity sensors coupled with the control module and arranged along the length of the elongate body. The plurality of proximity sensors can be configured to register an object within a predetermined distance. Each of the plurality of LED arrays can be have a proximity sensor adjacent thereto. The control module can transition the plurality of LED arrays adjacent to any of the plurality of proximity sensors registering an object within the predetermined distance. For example, the plurality of proximity sensors can register an object within the predetermined distance between the proximal end and the middle of the elongate body and the control module can transition, in response, any of the plurality of LED arrays disposed between the proximal end and the middle of the elongate body to a light emitting condition. In another example, the proximity sensors can register an object adjacent to the proximal end of the elongate body and the control module can transition the LED array adjacent to the proximal end from a non-light emitting condition to a light emitting condition.

Each of the plurality of LED arrays can include one or more lens modules. Each of the plurality of LED arrays can be substantially equally spaced from one another along the length of the elongate body. The plurality of LED arrays can be arranged such that a portion are located proximate a proximal end and a portion are located proximate a distal end. The portion of the plurality of LED arrays at a proximal end can be spaced closer together than the portion of the plurality of LED arrays at a distal end of the elongate body. The plurality of LED arrays can be located on one side of the elongate body. The plurality of LED arrays can be located on two or more side of the elongate body. In one example, LED arrays can be located on four or more sides of the elongate body.

The control module can transition each of the plurality of LED arrays from a non-light emitting condition to the light emitting condition after a predetermined length of time. The predetermined length of time can be different for each of the plurality of LED arrays. The plurality of LED arrays can be angled relative to the elongate body. The angle can be between 15 degrees and 60 degrees, and more specifically about 30 degrees.

An angled lens can be coupled to the elongate body can be coupled to the elongate body and an emitting surface of the angled lens can form an angle relative to the elongate body.

A multi-angle lens module is described with respect to FIGS. 1-7 and a lighting system and light control apparatus are described with respect to FIGS. 8-12. In at least one example, the multi-angle lens module described in FIGS. 1-7 can be implemented with the light control system and light control apparatus as described with respect to FIGS. 8-12 and collectively housed within a light stack assembly as described with respect to FIGS. 13-17.

The following provides a more detailed discussion of the multi-angled lens module, light control system, and light control apparatus with reference to the following figures.

FIG. 1 is an isometric view of a multi-angle lens module according to the present disclosure. The lens module 100 can have a light receiving area 102 (shown more clearly in FIG. 2) and a light emitting area 104. The light receiving area 102 and light emitting area 104 can be substantially parallel and separated by a predetermined distance 150. The lens module 100 can also include a first set of sidewalls 106 and a second set of sidewalls 110, each extending from the light receiving area 102. The first set of sidewalls 106 can be substantially parallel to one another, and the second set of sidewalls 110 can similarly be substantially parallel to one another.

The first set of sidewalls 106 can have a contour portion 108 extending from the light receiving area 102. The first set of sidewalls 106 extend extending the predetermined distance 150 between the light receiving area 102 and the light emitting area 104. The second set of sidewalls 110 can have a contour portion 112 extending from the light receiving area 102 and extending at least a portion of the predetermined distance 150.

The first set of sidewalls 106 generate a first reflection angle 114 of emitted light relative to a normal vector 152 extending from the light emitting area 104 and the second set of sidewalls 110 generate a second reflection angle 116 emitted light relative to the normal vector 152.

Each of the first set of sidewalls 106 and the second set of sidewalls 110 can have an inner surface 118 and an outer surface 120. The inner surface 118 can have the contour portion 108, 112, respectively. The inner surface 118 can be reflective and/or have a reflective coating configured reflect light from the contour portion 108, 112, respectively.

In at least one example, the lens module 100 is formed from a metal that has a high reflective index, for example aluminum. In another example, the lens module 100 can be polished to maximize light reflectiveness of the inner surface 118. In other example, the lens module can be molded, extruded, or otherwise formed from plastic and the inner surface 118 of the lens module 100 can be coated with a reflective film, for example aluminum foil, to increase the inner surface 118 reflectiveness.

The outer surface 120 can mirror the contour portion 108, 112, respectively, or be formed in any other shape. In at least one example, the outer surface 120 is substantially vertical while the inner surface 118 has the contour portion 108, 112. The thickness of the first set of sidewalls 106 and the second set of sidewalls 110 can vary between the inner surface 118 and the outer surface 120 along the contour portion 108, 112 depending on the arrangement of the outer surface 120, or be substantially the same depending on the arrangement of the inner surface and outer surface.

The lens module 100 can be extruded, molded, milled, or otherwise formed from any number of materials including, but not limited to, polymers, composites, metals, resins, wood, and/or any combination thereof.

Figure 2:
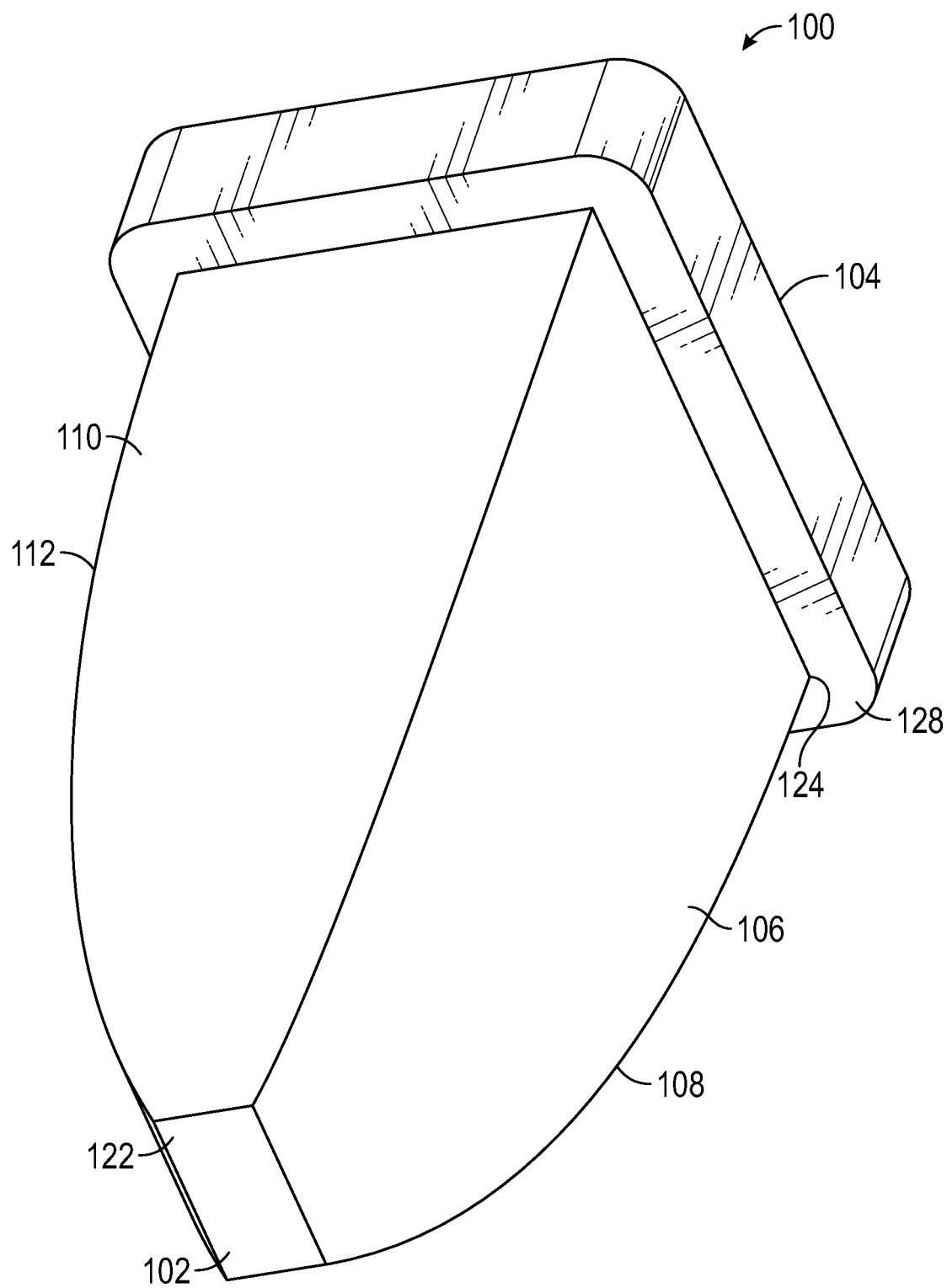
FIG. 2 is a bottom isometric view of a multi-angle lens module according to the present disclosure.

FIG. 2 is a bottom isometric view of a multi-angle lens module according to the present disclosure. The light receiving area 102 can be a substantially flat surface and can be configured to couple adjacent to a light source (shown in FIG. 5) to receive light into the lens module 100. While the light receiving area 102 is detailed as a rectangular surface, the light receiving area 102 can be any polygon shape including, but not limited to, square, circular, elliptical, and/or oval.

The light receiving area 102 can be a substantially transparent, or clear, surface to permit light traveling from a light source (shown in FIG. 5) to enter the lens module 100. In at least one example, the light receiving area 102 can be formed from optical glass to permit light receipt from the light source to the lens module 100. In other examples, the light receiving area 102 can be an aperture or void formed within a bottom surface 122 of the lens module to permit light receipt into the lens module 100.

As can further be appreciated in FIGS. 1 and 2, the lens module 100 can include a diffuser 126 coupled with an upper portion 124 of the lens module 100. The diffuser 126 can substantially cover the light emitting area 104. In at least one example, the diffuser 126 can extend beyond the light emitting area 104 and provide a lip 128 to couple the lens module 100 with a support structure, or tray, (shown in FIG. 7).

The diffuser 126 can have one or more diffuser lenses 130 coupled therewith. The one or more diffuser lenses 130 can maximize light distribution of the lens module 100 and improve light mixing in cooperation with the first reflection angle and the second reflection angle.

Figure 3:
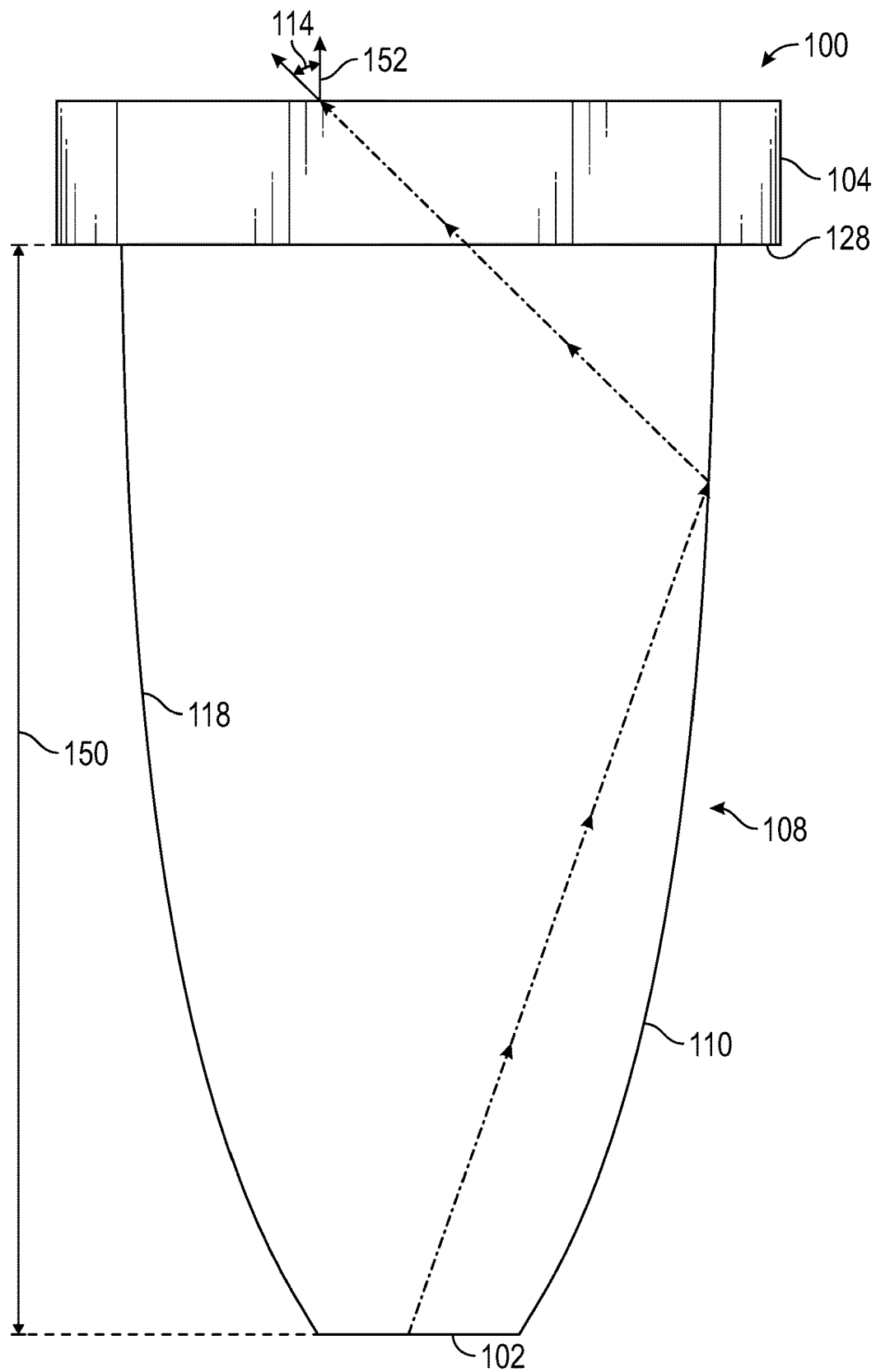
FIG. 3 is an elevational view of a first set of sidewalls of multi-angle lens module according to the present disclosure.

FIG. 3 is a profile view of a first set of sidewalls of a multi-angle lens module according to the present disclosure. The first set of sidewalls 106 can form the contour portion 108. The contour portion 108 can be defined by a single extensive equation. The single extensive equation can individually define the contour portion 108 of each sidewall of the first set of sidewalls 106. In at least one example, the contour portion can be described by a parabolic function. In one example, the first set of sidewalls can be defined by the parabolic curvature formed by the equation:

$$\rho(\theta) = \frac{2.2405}{0.2435\cos\theta - 0.9699\sin\theta + 1}$$

The contour portion 108 can generate a first reflection angle 114 relative to a normal vector 152 extending from the light emitting area 104. The normal vector 152 extends perpendicularly from the light emitting area 104. The contour portion 108 can be configured to reflect light emanating from a light source, through the light emitting area 104 at the first reflection angle 114.

The first reflection angle 114 can be between approximately 15° and 85° relative the normal vector 152. The first reflection angle 114 is determined by the contour portion 108 of the first set of sidewalls 106 and can be varied by altering the contour portion 108. In some examples, the first reflection angle is altered by changing the single extensive equation and/or parabolic function of the first set of sidewalls 106.

Figure 4:
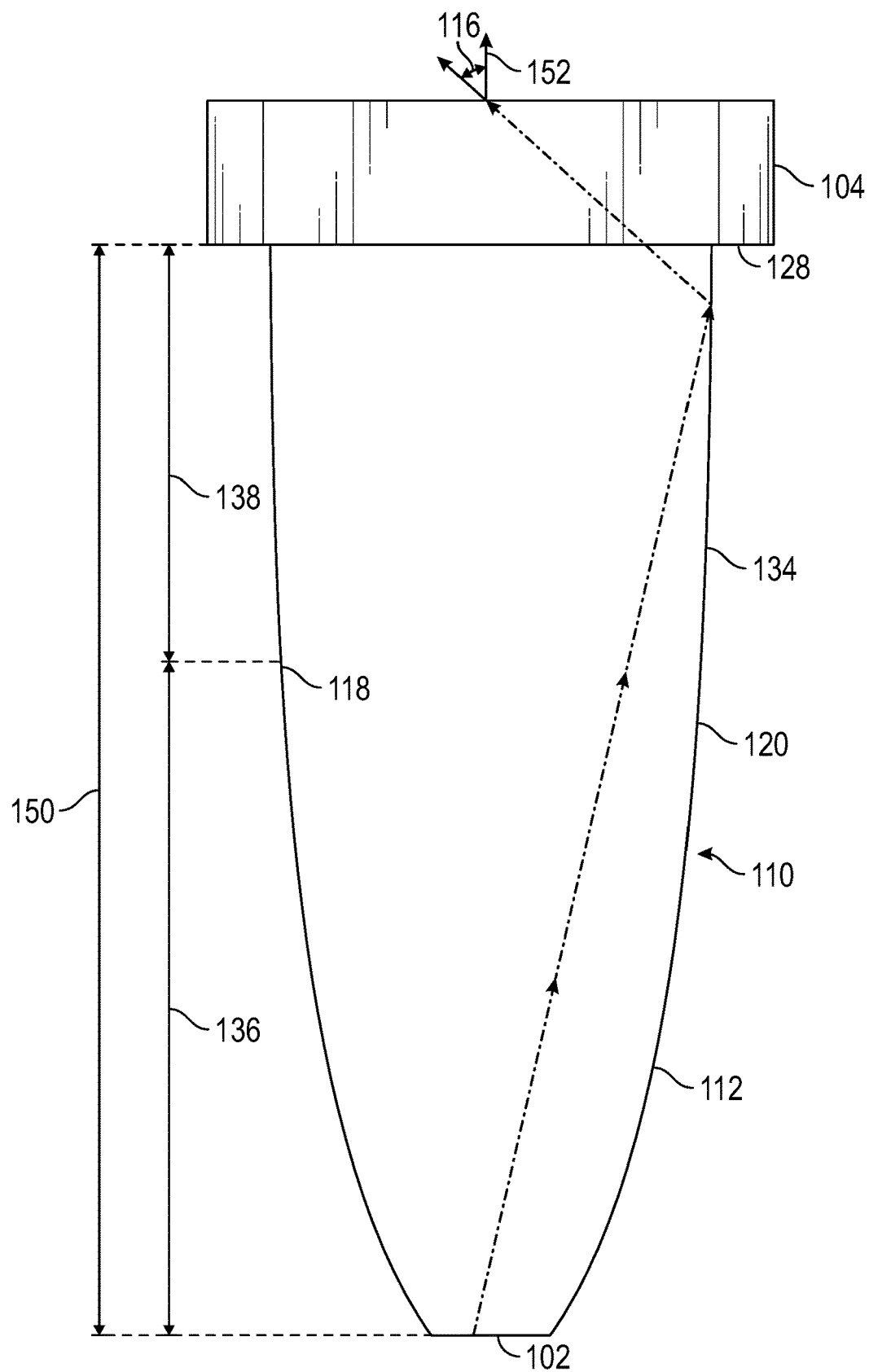
FIG. 4 is an elevational view of a second set of sidewalls of multi-angle lens module according to the present disclosure.

FIG. 4 is a profile view of a second set of sidewalls of a multi-angle lens module according to the present disclosure. The second set of sidewalls 110 can form the contour portion 112. The contour portion 112 can be defined by a single extensive equation. The single extensive equation can individually define the contour portion 112 of each sidewall of the second set of sidewalls 110. In at least one example, the contour portion can be described by a parabolic function. In one example, the second set of sidewalls can be defined by the parabolic curvature formed by the equation:

$$\rho(\theta) = \frac{4.5638}{0.3421\cos\theta - 0.9397\sin\theta + 1}$$

The contour portion 112 can generate a second reflection angle 116 relative to the normal vector 152 extending from the light emitting area 104. The contour portion 112 can be configured to reflect light emanating from a light source and through the light emitting area 104 at the second reflection angle 116.

The second reflection angle 116 can be between approximately 15° and 85° relative the normal vector 152. The second reflection angle 116 is determined by the contour portion 112 of the second set of sidewalls 110 and can be varied by altering the contour portion 108. In some examples, the first reflection angle is altered by changing the single extensive equation and/or parabolic function of the second set of sidewalls 110.

In at least one example, the contour portion 112 of the second set of sidewalls 110 can have two distinct contour portions. A first 132 of two distinct contour portions can extend a fraction 136 of the predetermined distance 150 from the light receiving area 102. A second 134 of the two distinct contour portions can extend a remaining fraction 138 of the predetermined distance 150. The first distinct contour portion 132 and the second distinct contour portion 134 can collectively make up the whole of the predetermined distance 150. The fraction 136 can be substantially one-half and the remaining fraction 138 can be substantially one-half. In other examples, the fraction 136 can also be any number between three-tenths (30%) and seven-tenths (70%).

Figure 5:
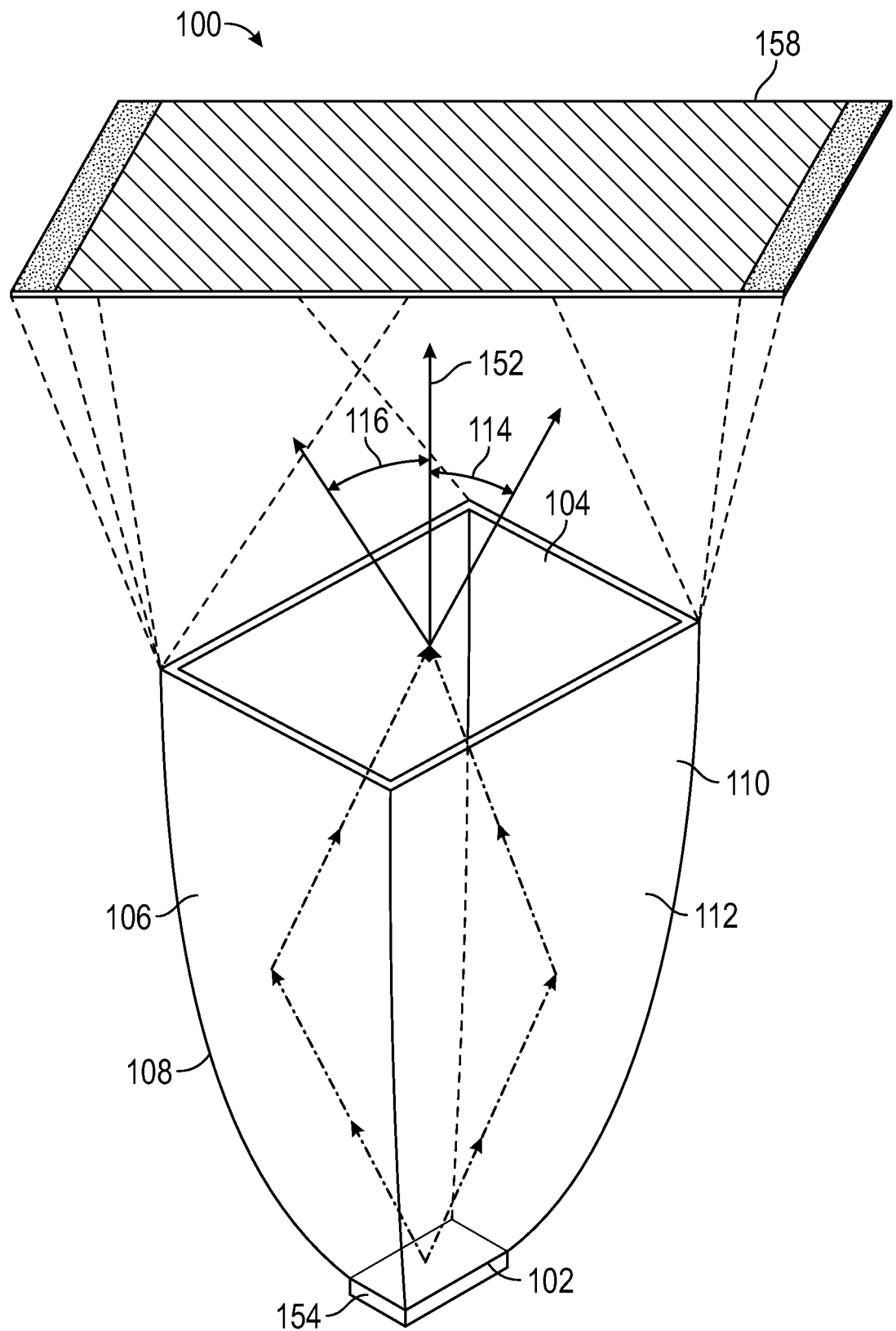
FIG. 5 is a diagrammatic view of a multi-angle lens module according to the present disclosure.

FIG. 5 is a diagrammatic view of a multi-angle lens module according to the present disclosure. The multi-angle lens module 100 can generate a first reflection angle 114 and a second reflection angle 116 with the first reflection angle 114 being different from the second reflection angle 116. The first reflection angle 114 and the second reflection angle 116 can provide light mixing of light received from a light source 154 while determining the light distribution 158 of the lens module 100.

The light source 154 can be adjacent to the light receiving area 102 and provide light into the lens module 100 through the light receiving area 102. The light can pass through the lens module 100 and be reflected by the first set of sidewalls 106 and/or the second set of sidewalls 110 exit the light emitting area 104 at the first reflection angle 114 or the second reflection angle 116.

The light source 154 can be an LED array. The LED array can be one or more LEDs arranged together. Each of the one or more LEDs can emit light at a predetermined wavelength and the predetermined wavelength can be different for each of the one or more LEDs. The LED array can be can further include a silica gel 160 disposed between the lens module 100 and the light source 154. In at least one example, the LED array can be a four by four diode LED array. In another example, the LED array can be a two diode LED array.

The lens module 100 can provide an optimized light distribution 158 of the light source 154 by generating the first reflection angle 114 and the second reflection angle 116. The diffuser 126 can further assist in achieving the desired light distribution 158. In at least one example, the light source 154 can have two or more individual light sources, each producing light at a different wavelength. The lens module 100 can be implemented to maximize light mixing to ensure the light distribution 158 is a substantially homogenous mixture of each of the two or more individual light sources.

Figure 6:
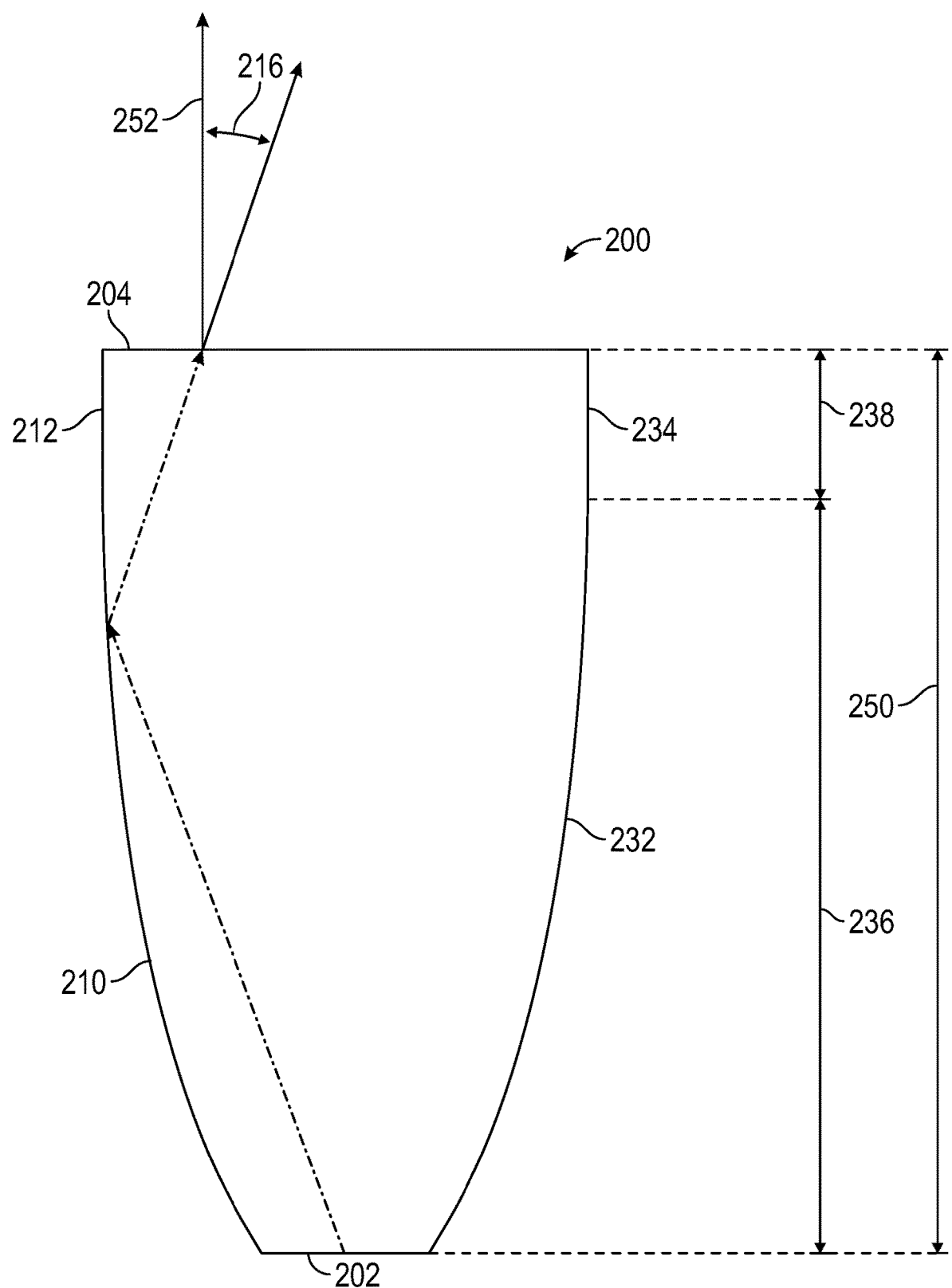
FIG. 6 is an elevational view of a second set of sidewalls of a multi-angle lens module according to a second example of the present disclosure.

FIG. 6 is a second example of a multi-angle lens module according to the present disclosure. A multi-angle lens module 200 can have a first set of sidewalls 206 having a contour portion 208 and a second set of sidewalls 210 having a contour portion 212. The contour portion 208 of the first set of sidewalls 206 can be formed by a single extensive parabolic equation and extend between a light receiving area 202 and a light emitting area 204. The light receiving area 202 and the light emitting area 204 can be separated by a predetermined distance 250. The first set of sidewalls 206 can generate a first reflection angle 214 relative to a normal vector 252 extending from the light emitting area 204.

The contour portion 212 of the second set of sidewalls 210 can have two distinct contour portions. The first of the two distinct contour portions can extend a fraction 260 of the predetermined distance 250 and follow a single extensive parabolic equation. The first of the two distinct contour portions can be the same as the contour portion 208 of the first set of sidewalls 206.

The second of the two distinct contour portions can extend the remaining fraction 262 of the predetermined distance 250. The fraction 260 and the remaining fraction 262 can make up the whole of the predetermined distance 250. In at least one example, the fraction 260 is substantially one-half and the remaining fraction 262 is substantially one-half.

The second of the two distinct contour portions can be substantially vertical and parallel to the normal vector 252. The second of the two distinct contour portions can allow the second set of sidewalls 210 to generate a second reflection 216 angle relative to the normal vector 252, even when the first of the two distinct contour portions mirrors the contour portion 208 of the first set of sidewalls 206. The first reflection angle 214 and the second reflection angle 216 are different, but can individually be any angle between about 15° and 85°.

Figure 7:
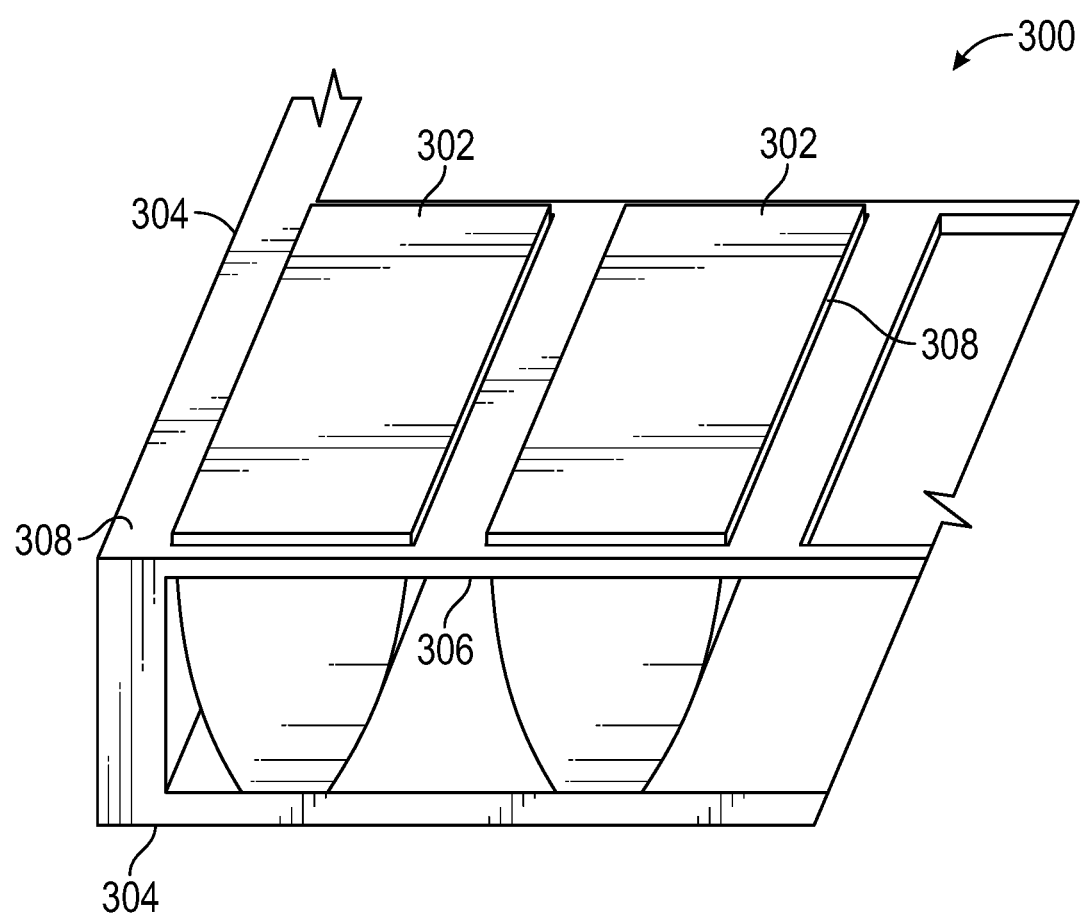
FIG. 7 is an isometric view of a plurality of multi-angle lens modules within a system according to the present disclosure.

FIG. 7 is an isometric view of a plurality of multi-angle lens modules coupled with a system according to the present disclosure. The system 300 can include a plurality of multi-angle lens modules 302 coupled to a tray 304. The tray 304 can have a perimeter element 306 configured to engage the lip 308 of the lens module 302. A clamping element (not shown) can be arranged to generate a pressure fit between the lip 308 and the perimeter element 306. In at least one example, each of the lens modules 302 can have an individual clamping element. In other examples, the tray 304 can have a single clamping element engaging the plurality of lens modules 302.

Figure 8:
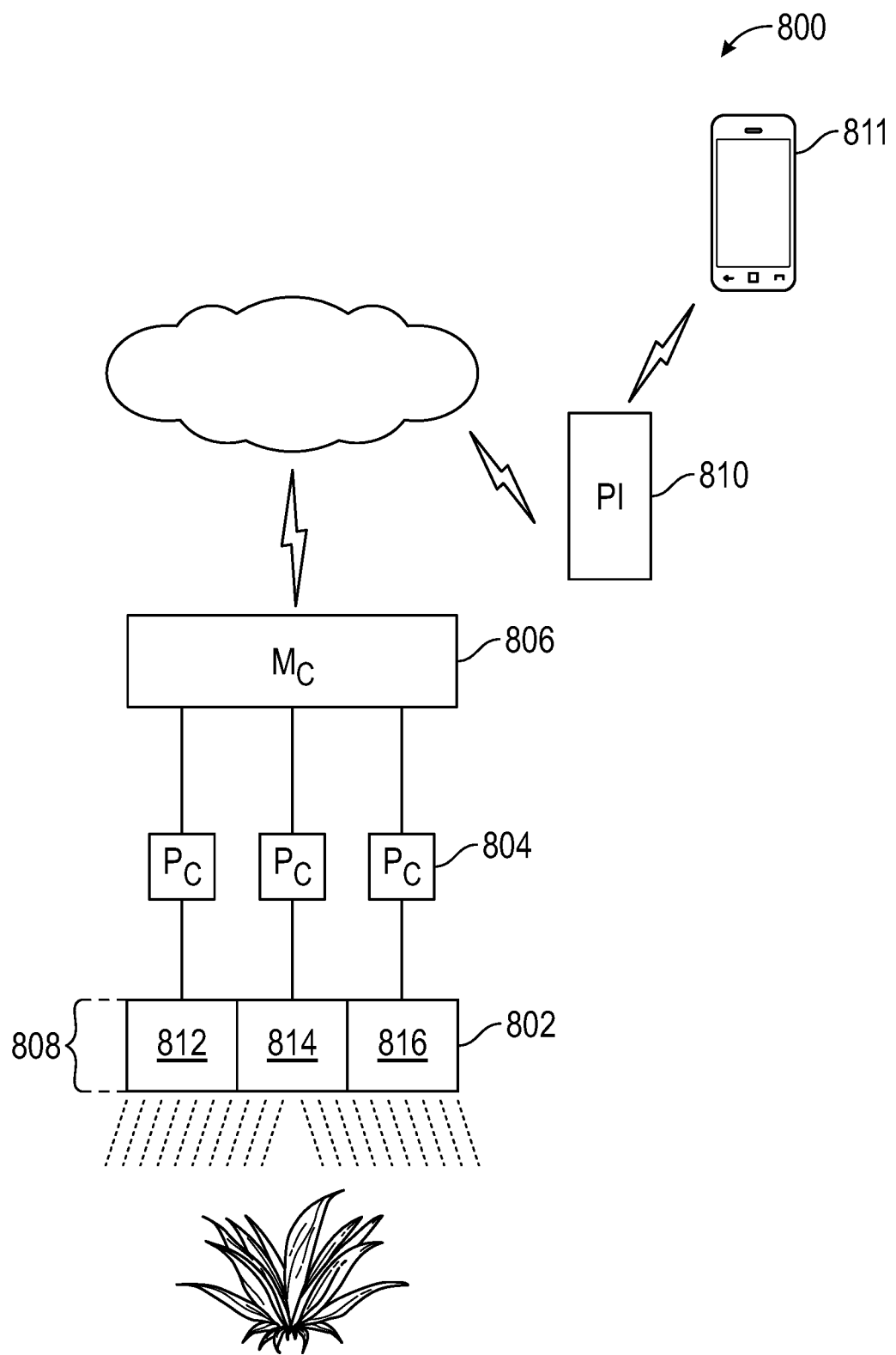
FIG. 8 is a diagrammatic view of a light system according to the present disclosure.

FIG. 8 is a lighting system according to the present disclosure. The lighting system 800 can have a plurality of light sources 802, a plurality of power output controllers 804, and master controller 806. In at least one example, the plurality of light sources 802 can be a plurality of light emitting diodes, each coupled with a lens module as described in FIGS. 1-7.

Each of the plurality of light sources 802 can be configured to output light at a predetermined wavelength and can be arranged in a corresponding group 808 according to the predetermined wavelength. In at least one example, the plurality of light sources 802 can be arranged in three groups, one group having a predetermined wavelength of about 475 nanometers, a second group having a predetermined wavelength of about 510 nanometers, and a third group having a predetermined wavelength of about 650 nanometers. Each of the power output controllers 804 can correspond to a different color band. The color band can be a cluster of frequency bands in the light spectrum associated with a certain color, for example blue light at 450 nanometers, green light at 525 nanometers, and red light at 650 nanometers.

The plurality of power output controllers 804 can be coupled with the corresponding groups of the plurality of light sources 802. The lighting system 800 can have a power output controller 804 for each of the corresponding groups 808. The plurality of power output controllers 804 can be configured to output a predetermined power level to the corresponding groups 808 of light sources 802.

A master controller 806 can be coupled with the plurality of power output controllers 804 and configured to provide a signal to the plurality of power output controllers 804. The master controller 806 can adjust the desired duty cycle, cycle period, and/or phase shift for each of the plurality power output controllers 804. In at least one example, the plurality of power output controllers 804 and the master controller 806 can generate a pulse-width modulation to control the plurality of light sources 802.

The lighting system 800 can further include a plant input unit 810. The plant input unit 810 can be communicatively coupled with the plurality of power output controllers 804 and/or the master controller 806. The plant input unit 810 can be configured to adjust the desired duty cycle, cycle period, and/or phase shift for each of the corresponding groups 808. The plant input unit 810 can be wired or wirelessly coupled to the lighting system 800. In at least one example, plant input unit 810 can be a cloud based device storing data relating to a plurality of plant species and the associated plant species' optimal duty cycle, cycle period, and/or phase shift for each corresponding group. In another example, the plant input unit 810 can be a server having one or more data storage devices and communicatively coupled to a network including one or more lighting systems 800.

The plant input unit 810 can receive an input from a user indicating a particular plant species and/or variety. The plant input unit 810 can then communicate with the plurality of power output controllers 804 and/or the master controller 806 to adjust the duty cycle, cycle period, and/or phase shift of the corresponding groups 808 of light sources 802 to optimize plant growth. In at least one example, the plant input unit 810 can be communicatively coupled with a mobile electronic device 811 and coupled with a cloud based device, wherein the user inputs a plant species into the mobile electronic device and the plant input unit 810 communicates with the plurality of output controllers 804 and/or the master controller 806. In another example, the plant input unit 810 can have a camera coupled with a cloud based device. The camera can detect leaf shape or other qualities about the plant to determine the plant species and optimal peak amplitude for the corresponding groups 808.

Figure 9:
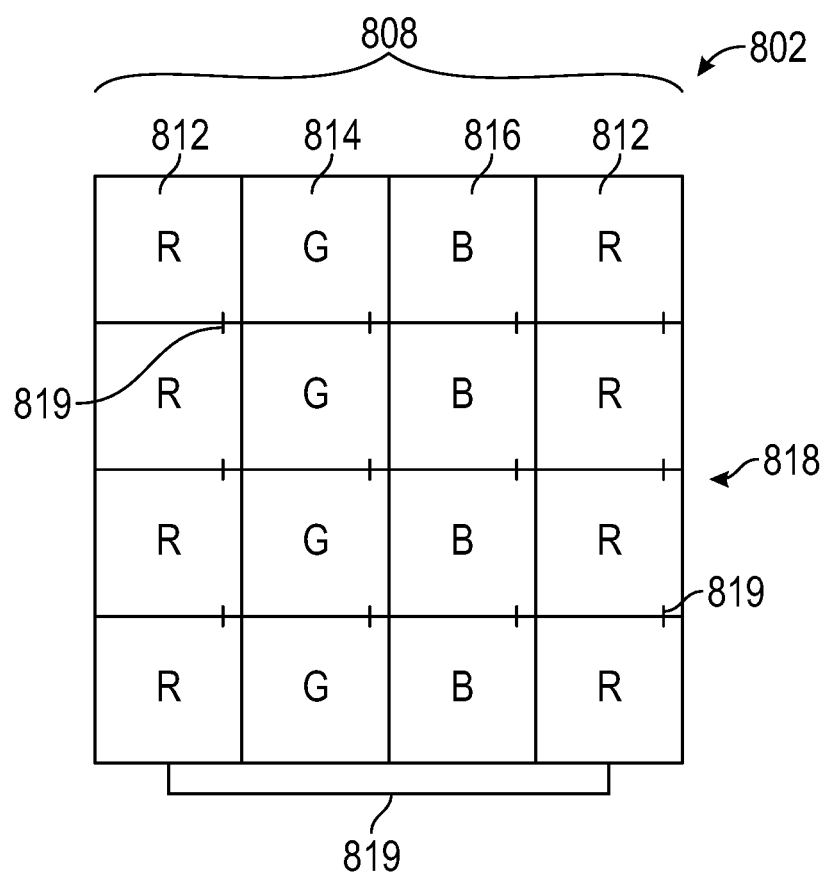
FIG. 9 is a diagrammatic view of a plurality of LEDs arranged in corresponding groups according to the present disclosure.

FIG. 9 is a plurality of light sources arranged in corresponding groups according the present disclosure. The plurality of light sources 802 can be arranged in corresponding groups 808 according to the predetermined wavelengths. The plurality of light sources 802 can be arranged in three corresponding groups 812, 814, 816 with each of the three corresponding groups 812, 814, 816 having a different predetermined wavelength. In at least one example, the three corresponding groups 812, 814, 816 can be arranged in an array of columns. The first group 812 of the corresponding groups 808 can be a plurality of light sources producing a predetermined wavelength of about 650 nanometers, or light within the red visible spectrum. The second group 814 of the corresponding groups 808 can be a plurality of light sources producing a predetermined wavelength of about 510 nanometers, or light within the green visible spectrum. The third group 816 of the corresponding groups 808 can be a plurality of light sources producing a predetermined wavelength of about 475 nanometers, or light within the blue visible spectrum. In another example, the corresponding groups 808 can include a fourth group of light sources producing a predetermined wavelength between 700 nanometers and 1,000,000 nanometers, or light within the infrared spectrum.

The corresponding groups 808 can collectively form a light array 818. The corresponding groups 808 within the light array 818 can be arranged in any number of ways, patterns, or randomly. The corresponding groups 808 can be arranged by column, rows, diagonally, random order, or any other ordering method/algorithm. In at least one example, the light array 818 has three corresponding groups 812, 814, 816, with each group arranged in a column and corresponding group 812 having two columns. Corresponding group 812 is provided with twice the number of light sources 802 as corresponding groups 814 and 816. In other examples, the second column of corresponding group 812 can be a plurality of different light sources 802, such as infrared.

The light sources 802 within each corresponding group 808 can be electronically coupled with other light sources 802 within a particular group by an electrical coupling 819. The electrical coupling 819 can be a jumper wire coupling each light source 802 within a corresponding group in series. Alternatively, electrical coupling 819 can be a jumper wire coupling each light source 802 within a corresponding group 808 in series or parallel.

While FIG. 9 details a light array 818 having four columns by four rows arranged in three corresponding groups, the light array 818 can include any number of corresponding groups, plurality of light sources, and/or arrangement.

In at least one example, a lens module 100 as described in FIGS. 1-7 can be coupled with a single LED, multiple LEDs, a single corresponding group of LEDs, or any combination thereof. For example, the lens module can be coupled with one LED from a first corresponding group and one LED from a second corresponding group.

Figure 10A:
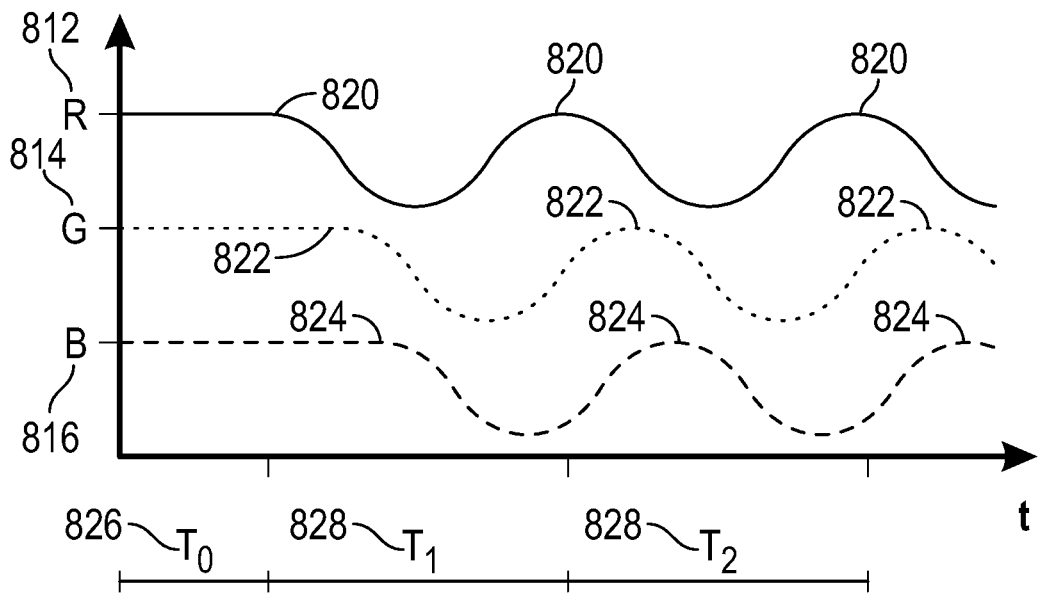
FIG. 10A is a graphical representation of a master controller shifting phase of the plurality of LEDs according to the present disclosure.

FIG. 10A is a graphical representation of a master controller shifting phase. The master controller 806 can be coupled with the plurality of power output controllers 804 and coupled with three corresponding groups 812, 814, 816 with each of the corresponding groups having a predetermined wavelength. Each of the three corresponding groups 812, 814, 816 can have an individual power output controller 804. The master controller 806 can provide a signal to the respective power output controller 804 adjusting the phase, thus shifting the peak amplitude.

The master controller 806 can provide a signal to each of the corresponding groups 812, 814, 816 to provide peak power for a first predetermined period of time 826. After the first predetermined period of time 826, the master controller 806 can provide a signal to the plurality of power output controllers 804 to oscillate the signal. During a second predetermined period of time 828, the oscillating signal can be a sinusoidal oscillation generated by the plurality of power output controllers 804. The master controller 806 can signal the plurality of power output controllers 804 to adjust the peak amplitude so that peak emissions are shifted 120 degrees in phase relative to the adjacent peak. A peak amplitude 820 of the first group 812 can be at the first predetermined period of time 826 and start the oscillation immediately thereafter. The second group 814 can maintain a peak amplitude 822 until beginning oscillation in response to a signal from the master controller 806 shifting the peak amplitude 822 of the second group 814 approximately 120 degrees in phase relative to the peak amplitude 820 of the first group 816. A peak amplitude 824 of the third group 816 can be shifted approximately 120 degrees in phase relative to the peak amplitude 822 of the second group and approximately 240 degrees in phase relative to the peak amplitude 820 of the first group.

While the illustrated example details a phase shift of 120 degrees for each of the first group 812, the second group 814, and the third group 816, it is within the scope of this disclosure to have any phase shift between 0 and 360 degrees, generated by the master controller 806.

The master controller 806 can provide signals to the plurality of power output controllers 804 to generate oscillation of each of the corresponding groups 808. The phase shift for each of the corresponding groups 808 can reduce overall power consumption by reducing power draw at any particular point in time. Peak power draw can occur when each of the three corresponding groups is at peak amplitude, for example the first predetermined period of time 826. Power draw can be reduced during the second predetermined period of time 828 by shifting the peak amplitude of each corresponding group 808 relative to another.

The second predetermined time period 828 can represent a cycle period. The cycle period can be the amount of time between two peak amplitudes of a particular group and the cycle period can be shortened or lengthened by the master controller 806 for each of the corresponding groups 808 individually. In at least one example, the cycle period can be 1000 μs (microseconds). For example, during germination and initial growth the cycle period can be shorter, while during fruiting of a mature plant the cycle period can be lengthened.

In at least one example, the oscillation of each of the corresponding groups 808 can provide light from each of the corresponding groups 808 light source 802 without reducing light absorption at a particular point. Oscillation does not prevent a plant exposed to the lighting system from absorbing light for photosynthesis. The oscillation provides the plant with effective amounts of each of the corresponding groups 808, while maintaining efficient growth and reducing overall power consumption.

While the illustrated example details each of the three corresponding groups having peak amplitude during the first predetermined period of time 826, it is within the scope of this disclosure to have one, two or any number of the corresponding groups at peak amplitude during the first predetermined period of time 826. Further, while the oscillation and phase shift is described with respect to three corresponding groups, it is within the scope of this disclosure for the master controller and plurality of power output controllers to generate a phase shift and oscillation in one, two, three, or more groups of light sources 802. The phase shift can be determined by the number of groups to maximize energy reduction. For example, for two corresponding groups the phase shift between the two groups can be approximately 180 degrees, while for four corresponding groups the phase shift between the four groups can be approximately 90 degrees.

Figure 10B:
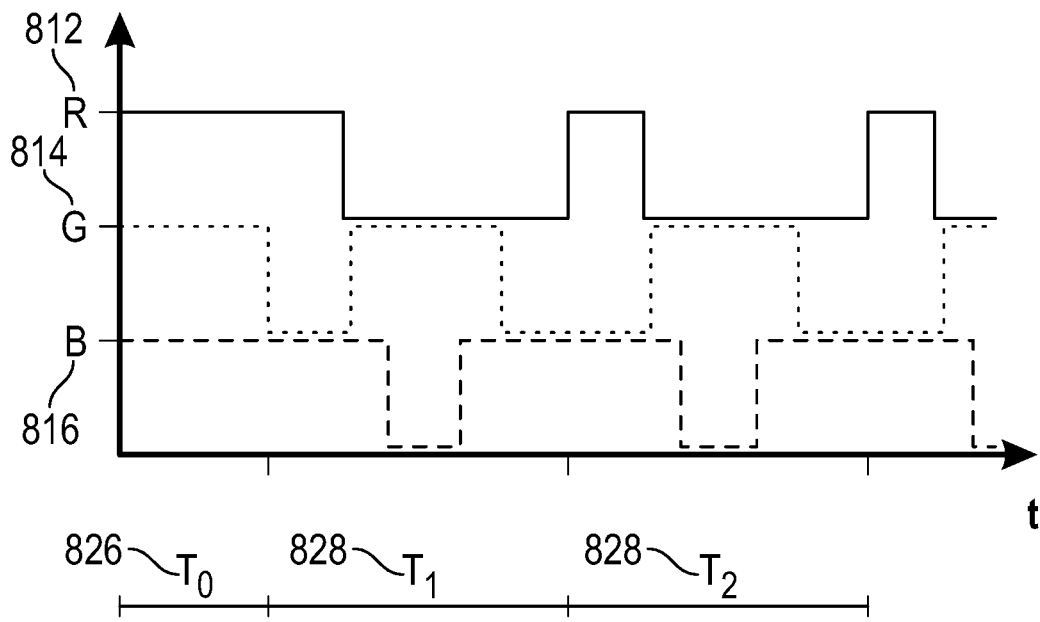
FIG. 10 B is a graphical representation of a master controller shifting duty cycle of the plurality of LEDs according to the present disclosure.

FIG. 10B is a graphical representation of a duty cycle. The master controller 806 can adjust the duty cycle of each of the corresponding groups 808 individually. The duty cycle 850 can be the intermittent operation of the corresponding groups 808, alternating between a light emitting condition and a non-light emitting condition. The duty cycle 850 can determine the portion of the second predetermined period of time 828 during which a corresponding group 808 is in a light emitting condition or a non-light emitting condition. The duty cycles 850 for each of the corresponding groups 808 can be individually controlled within a cycle period. In the light emitting condition, the corresponding group 808 can receive a constant current flow from the associated power output controller 804. In the non-light emitting controller, the corresponding group 808 can receive no current flow from the associated power output controller 804. The duty cycle 850 can be shifted by the same phase, as discussed with respect to FIG. 10A In at least one example, the duty cycle for the first group 812 can allow a light emitting condition for 25% of the cycle period, while the duty cycle for the second group 814 can generate a light emitting condition for 50% of the cycle period, and the duty cycle for the third group 816 can generate a light emitting condition for 75% of the cycle period.

In at least one example, the duty cycle for each of the corresponding groups 808 can begin after a first predetermined period of time 826 where each of the corresponding groups 808 receives a constant current flow from the plurality of power output controllers 804.

Adjusting the duty cycle for each of the first group 812, the second group 814, and the third group 816 can alter the density of light output by increasing and/or decreasing the amount of light at a wavelength from each of the corresponding groups 808. For example, increasing the duty cycle from 25% to 50% for the first group 812 can increase the amount of red light provided to the plant. The control of the different density of light output can be achieve by changing the driving currents. Additionally, the changes in phase shifting and cycle period can remain the same when the light output density is adjusted by the driving currents. In other examples, the phase shift and cycle period can be adjusted either independently or together.

The master controller 806 can adjust the cycle period, duty cycle, and/or phase shift for each of the corresponding groups individually. The plant input unit 810 can store data relating to the preferred or optimal cycle period, duty cycle, and/or phase shift for a plurality of plants and provide the appropriate data to the master controller 806. The master controller 806 can synchronize the plurality of power output controllers 804 to the appropriate cycle period, duty cycle, and phase shift for the appropriate plant.

While the illustrated embodiment details a common cycle period for each of the corresponding groups, it is within the scope of this disclosure to vary the cycle period for each of the corresponding groups individually.

Figure 11:
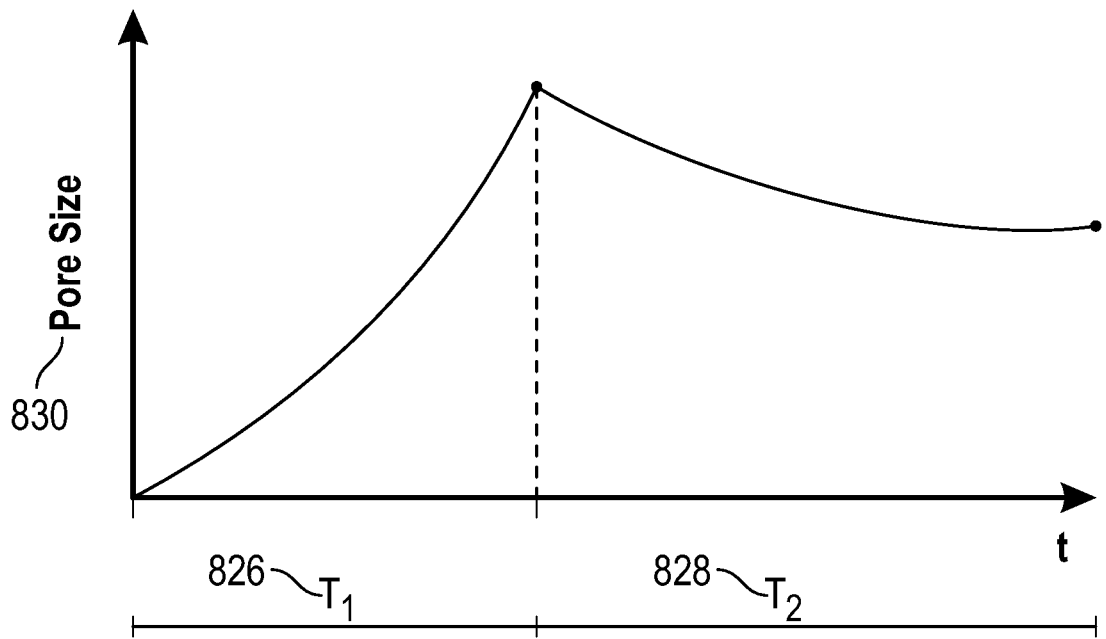
FIG. 11 is a graphical representation of pore size according to the present disclosure.
Figure 12:
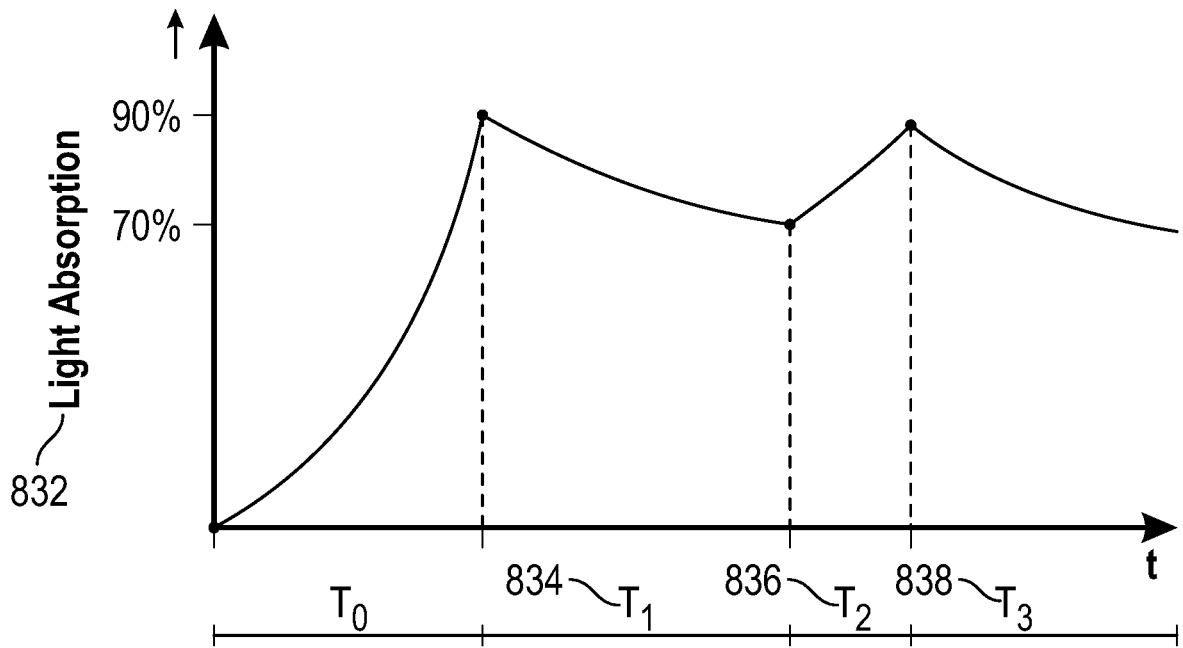
FIG. 12 is a graphical representation of absorption rate according to the present disclosure.

FIGS. 11 and 12 relate to the lighting system and related light control apparatus implemented with a plant growth operation. The plant growth operation can utilizing the lighting system 800 with, or without, a multi-angle lens module to maximize energy efficient plant growth. The lighting system 800 can be optimized for individual plant varieties through coupling with a plant input unit 810. While the FIGS. 11 and 12 relate to a plant growth operation, it is within the scope of this disclosure to implement the lighting system and related light control apparatus within other endeavors.

FIG. 11 is a graphical representation of pore size. The pore size 830 of a plant exposed to the lighting system 800 can vary with time. The pore size 830 during the first predetermined period of time 826 can increase due to exposure to the lighting system, thus increasing the light absorption rate (discussed below with respect to FIG. 12). After the first predetermined period of time 826 and during the second predetermined period of time 828, the pore size 830 can slowly decrease due to oscillation of the corresponding groups 808. The pore size 830 can remain suitable for efficient plant growth throughout the second period of time 828.

FIG. 12 is a graphical representation of light absorption rate. The lighting system 800 can utilize plurality of power output controllers 804 and the master controller 806 to manage and reduce overall power consumption by oscillating and shifting phase for each of the corresponding groups 808. The light absorption rate 832 (shown as a percentage) can decrease over a first period of time 834 during oscillation of the corresponding groups 808 of light sources 802. The light absorption rate 832 can be boosted by a second period of time 836 in which each of the corresponding groups 808 are operated at peak amplitude simultaneously without oscillation. The second period of time 836 operating at peak amplitude for each of the corresponding groups 808 can "wake up" a plant, thus boosting light absorption rate. The second period of time 836 can be followed by a third period of time during which oscillation and phase shift of the corresponding groups 808 occurs. The "wake up" period for the plant can be scheduled for a predetermined period of minutes, every few hours, every day, once a week, or otherwise as determined by the particular plant species and/or variety being utilized. In some examples, the plant input unit 810 can determine the desired "wake up" period.

The length of time of the first period of time 834, second period of time 836, and third period of time 838 can vary depending on the plant variety and/or species being utilizing in the growing operation. The first period of time 834, second period of time 836, and third period of time 838 can also vary in length individually. The first period of time 834 and the third period of time 838 can be substantially equal in length of time, while the second period of time 836 can be shorter. Alternatively, the first period of time 834 can be longer than the third period of time 838, but the second period of time 836 can be significantly shorter than either the first period of time 834 or the second period of time 838. The first period of time 834, second period of time 836, and third period of time 838 are determined by the plant input unit 810. In at least on example, the first period of time 834 and the third period of time 838 can be approximately 60-90 minutes in duration while the second period of time 836 can be approximately 10-15 minutes in duration.

Figures 13, 14:
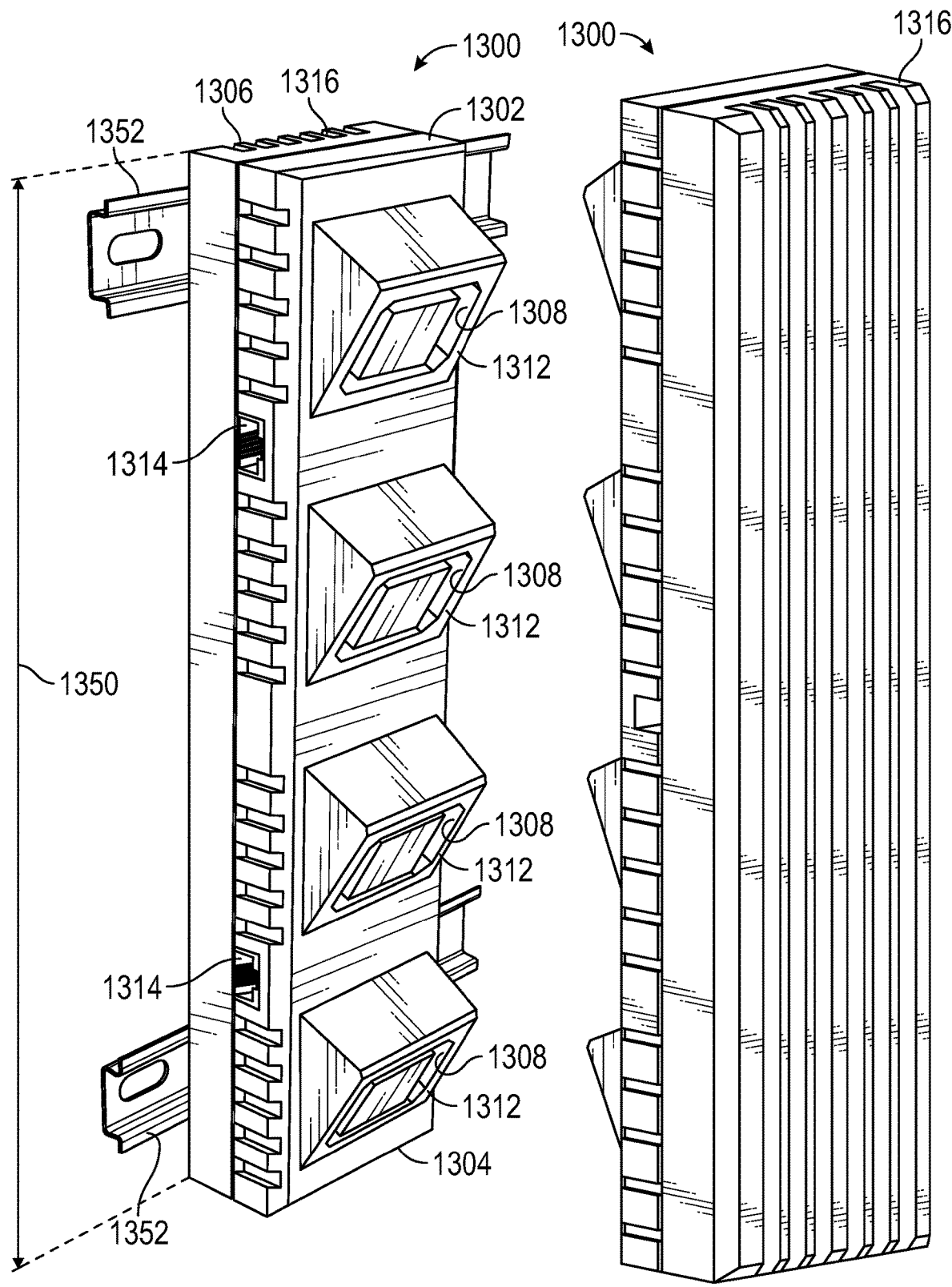
FIG. 13 is a front isometric view of a light stack assembly and mounting structure according to the present disclosure.
FIG. 14 is a rear isometric view of a light stack assembly according to the present disclosure.

FIG. 13 is an isometric view of a light stack assembly 1300. The light stack assembly 1300 can have an elongate body 1302. The elongate body 1302 can have a length 1350 extending from a proximal end 1304 to a distal end 1306. A plurality of LED arrays 1308 can be coupled with the elongate body 1302 and arranged along the length 150 thereof. The elongate body 1302 can be substantially hollow and allow the plurality of LED arrays 1308 to be coupled with and disposed within the elongate body 1302.

The elongate body 1302 can have any number of LED arrays 1308 disposed along the length 1350. The plurality of LED arrays 1308 can be evenly spaced along the length 1350 of the elongate body 1302. In at least one example, the elongate body 1302 has four LED arrays 1308 evenly spaced along the length 1350 between the proximal end 1304 and distal end 1306. In other examples, the plurality of LED arrays 1308 can be spaced closer together at the proximal end 1304 than at the distal end 1306 or spaced closer together at the distal end 1306 than at the proximal end 1304. In an example where only four LED arrays are implemented, the spacing between the middle two LED arrays can be greater than a distance between the first two LED arrays. In another example, the LED arrays can be clustered with a first group of LED arrays disposed proximate the proximal end and evenly spaced among the first group of LED arrays, a second group of LED arrays disposed substantially in the middle of the elongate body and evenly spaced among the second group of LED arrays, and a third group of LED arrays disposed proximate the distal end and evenly spaced among the third group of LED arrays. The spacing within the first group, the second group, and the third group can be substantially the same, with the spacing between groups being greater than the spacing within a group.

While FIG. 13 details an elongate body 1302 having four LED arrays 1308 coupled with therewith, it is within the scope of this disclosure to couple any number of LED arrays 1308 with the elongate body 1302. For example, the elongate body 1302 can have two, three, five, or more LED arrays 1308 coupled therewith. Further, while FIG. 13 details an elongate body 1302 having LED arrays 1308 on one surface of the elongate body 1302, it is within the scope of this disclosure to implement LED arrays 1308 on more than one surface of the elongate body 1302. For example, the elongate body 1302 can have a plurality of LED arrays 1308 disposed on the front side and a plurality of LED arrays 1308 disposed on the opposing rear side. In another example, one side of the elongate body 1302 is free from LED arrays to allow for a heat dissipation device.

Figure 15:
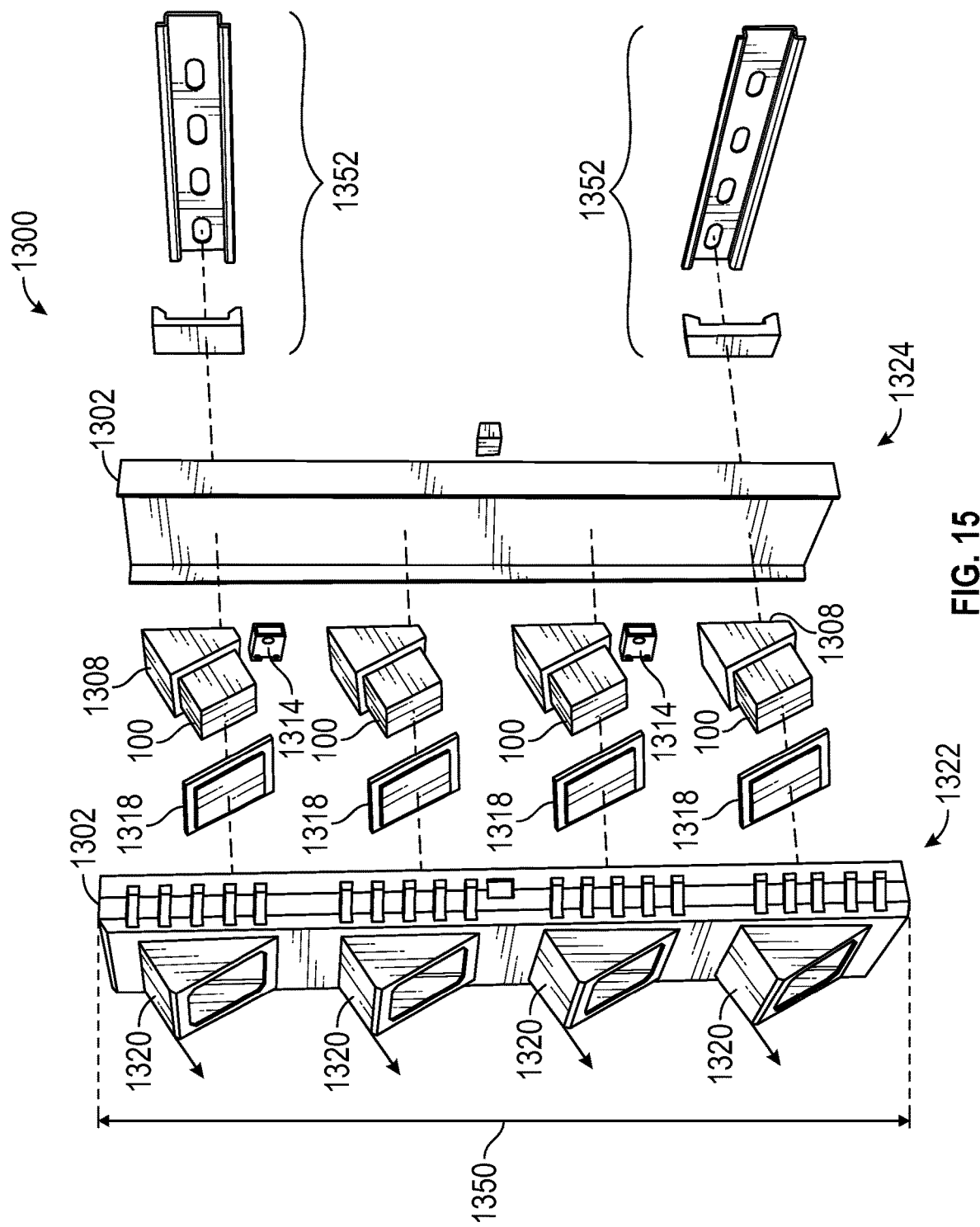
FIG. 15 is an exploded isometric view of the light stack assembly and mounting structure of FIG. 13 according to the present disclosure.

The plurality of LED arrays 1308 can be coupled with a control module 1310 (shown more clearly in FIG. 15). The control module 1310 can be configured to individually transition each of the plurality of LED arrays 1308 between a light emitting condition and a non-light emitting condition.

Figure 16:
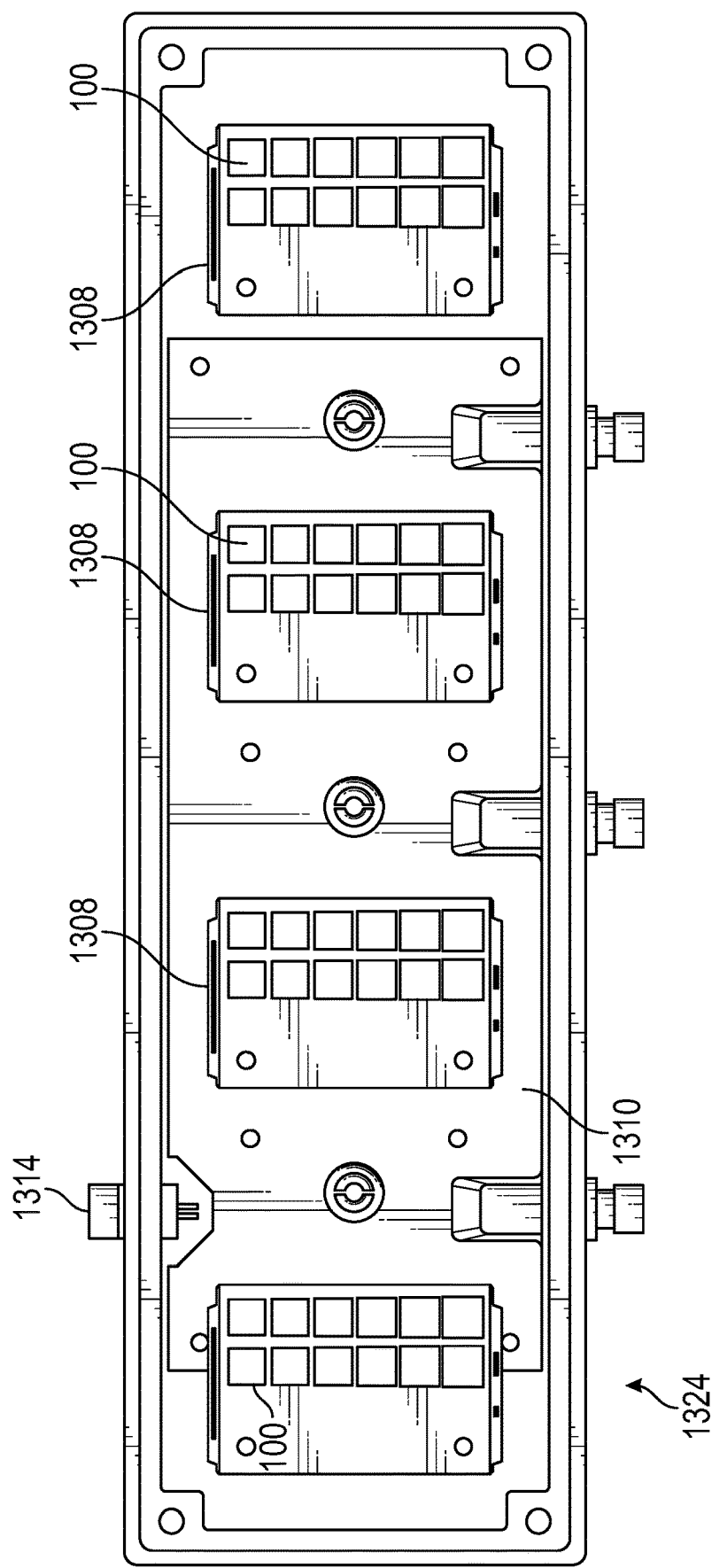
FIG. 16 is a top view of a rear portion of a light stack assembly according to the present disclosure.

The light stack assembly 1300 can have a plurality of proximity sensors 1312 coupled with the elongate body 1302 and the control module 1310 (shown in FIG. 16). The plurality of proximity sensors 1312 can be arranged along the length 1350 of the elongate body 1302 and configured to register an object within a predetermined distance. The plurality of proximity sensors 1312 can determine whether an object is within the predetermined distance and the control module 1310 can transition one or more of the plurality of LED arrays 1308 in response to the determination of the plurality of proximity sensors 1312. In at least one example, the control module 1310 can transition an adjacent LED array 1308 in response to an object as determined by the plurality of proximity sensors 1312. The predetermined distance can be based on the implemented sensors, adjusted by the control module 1310, or set in response to a user input.

The light stack assembly 1300 can be implemented within a controlled plant growth environment and the plurality of proximity sensors 1312 can be arranged to determine the overall plant growth. As the plant growth increases along the length 1350 of the elongate body 1302, subsequent proximity sensors of the plurality of proximity sensors 1312 can detect the plant growth (object) and transition the subsequent LED arrays 1308 from a non-light emitting condition to a light emitting condition, thus reducing energy consumption.

The elongate body 1302 can include one or more network connections 1314 to couple the light stack assembly 1300 with an intranet, the internet, or other network. The light stack assembly 1300 can also have a wireless communication module to allow wireless communication with an intranet, the internet, or other network. In at least one example, the one or more network connections 1314 can couple the light stack assembly 1300 with the plant input unit 810 and the cloud based storage. The one or more network connections 1314 can receive inputs relating to the predetermined distance detectable by the plurality of proximity sensors 1312.

The light stack assembly 1300 can include a mounting structure 1352 configured to couple the elongate body 1302 with an adjacent environment. The mounting structure 1352 can allow the light stack assembly 1300 to mount to a vertical surface, a horizontal surface, or any surface at any angle.

FIG. 14 is a rear isometric view of a light stack assembly according to the present disclosure. The elongate body 1302 can be formed, milled, molded, machined, or 3-D printed from polymers, metals, epoxy resins, wood, or any other material. The elongate body 1302 can have a heat dissipation portion 1316 formed into at least one side. The heat dissipation portion 1316 can be a passive cooling system configured to allow the light stack assembly 1300 to reject waste heat to an ambient environment. While the heat dissipation portion 1316 is shown on the rear surface of the elongate body 1302, it is within the scope of this disclosure to implement a heat dissipation portion 1316 on any surface of the elongate body 1302. Further, while a passive cooling system is shown and described, it is within the scope of this disclosure to implement a non-passive cooling system, for example forced air cooling or liquid cooling.

FIG. 15 is an exploded view of a light stack assembly and mounting structure according to the present disclosure. The light stack assembly 1300 can have a lens 1318 coupled to the elongate body 1032 and providing an emitting surface an LED array 1308. The light stack assembly 1300 can have a plurality of lenses 1318 corresponding to each of the plurality of LED arrays 1308. The plurality of lenses 1318 can be formed at an angle 1320 relative to the elongate body 1302. The angle 1320 can be between 15 degrees and 60 degrees relative to the elongate body 1302. In at least one example, the angle 1320 is about 30 degrees.

While FIG. 15 details an elongate body 1302 having the plurality of LED arrays 1308 arranged at an angle relative to the elongate body 1302, it is within the scope of this disclosure to arrange the LED arrays 1308 to emit light perpendicular to the length 1350 of the elongate body 1302. An optical device can be implemented to distribute the emitted light at any angle relative to the elongate body 1302. The lens 1318 can be maintained at an angle relative to the elongate body 1302 with the optical device disposed between the lens 1318 and the LED array 1308.

The elongate body 1302 can be a two-piece construction having a front portion 1322 and a rear portion 1324. The front portion 1322 and the rear portion 1324 can be coupled together via a snap connection, pressure fit, tongue-groove, or threaded fasteners. The two-piece construction of the elongate body 1302 can provide easy access to interior components disposed within, for example the plurality of LED arrays 1308. In at least one example, a gasket can be included to seal the components from wet/humid environment conditions. A valve can be configured to allow pressure equalization, but prevent entrance of moisture.

The light stack assembly 1300 can have a plurality of lens modules 100 disposed therein and coupled with the plurality of LED arrays 1308. In at least one example, each LED array 1308 can have a plurality of lens modules 100 coupled therewith. In another example, each LED array 1308 can have a single lens module 100 coupled therewith.

FIG. 16 is a partially assembled rear portion of a light stack assembly according the present disclosure. The rear portion 1324 can receive the control module 1310 and a plurality of LED arrays 1308 therein. The control module 1310 can be coupled with each of the plurality of LED arrays 1308 and configured to transition each between a light emitting condition and a non-light emitting condition.

The control module 1310 can be implemented with a master controller 806, described above with respect to FIGS. 9-12. The control module 1310 can be coupled with a master controller 806 or integrated therewith and coupled to a plant input unit 810 to receive instructions. The plant input unit 810 can control the oscillation of a LED array 1308, as described above, and send instructions to the control module 1310 to transition one or more LED arrays 1308 between the light emitting condition and the non-light emitting condition.

In at least one example, the control module 1310 can transition each of the plurality of LED arrays 1308 from the non-light emitting condition to the light emitting condition after a predetermined period of time. The control module 1310 can transition each of the plurality of LED arrays 1308 sequentially from one end of the elongate body 1302 to the opposing end of the elongate body. In another example, the control module 1310 can transition each of the plurality of LED arrays 1308 a predetermined period of time, with each LED array 1308 having a different predetermined period of time. In another example, the control module 1310 can transition each of the LED arrays 1308 according to the detection of an object by the plurality of proximity sensors 1312. In yet another example, the control module 1310 can transition the plurality LED array 1308 according to instructions received from the plant input unit 810. The plant input unit 810 can determined the appropriate predetermined period of time before transition each of the plurality of LED arrays 1308.

The control module 1310 can increase the energy efficiency and reduce overall consumption of the light stack assembly 1300 by transitioning the appropriate LED array 1308 during the appropriate stage of plant growth. For example, a LED array 1308 at the proximal end 1304 can be operate at the beginning stages of plant growth (germination). As plant height increases, subsequent LED arrays 1308 in the middle of the elongate body 1302 can be transitioned from the non-light emitting condition to the light emitting condition to ensure the plant has sufficient light exposure for optimal growth. The control module 1310 can continue transition subsequent LED arrays 1308 as plant growth occurs, ensuring only necessary and relevant LED arrays 1308 are transition, thus saving energy. In at least one example, the control module can transition the LED arrays 1308 from the light emitting condition to the non-light emitting condition after the plant has reached a certain height.

The light stack assembly 1300 can be implemented with a lens module 100 disposed on the LED array 1308 and the plurality of power output controllers 804 and the master controller 806 working in combination with the control module 1310 to reduce energy consumption of individual LED arrays 1308 and the light stack assembly 1300.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A light system comprising:
   a plurality of light emitting diodes (LEDs) arranged in an array, the array having two or more groups based on color band of light output from the LEDs;
   a plurality of output controllers, wherein a single one of the plurality of output controllers is assigned to each of the two or more groups and each of the plurality of output controllers operable to adjust output power to the assigned group of light emitting diodes;
   a master controller coupled to the plurality of output controllers and operable to synchronize the plurality of output controllers, wherein the master controller is operable to receive data from a remote device indicating a desired duty cycle, cycle period, and phase shift of the output power relative to one another,
   wherein the master controller is operable to provide an oscillating signal to each of the plurality of output controllers to oscillate output power to the corresponding groups of light emitting diodes between a light emitting condition and a non-light emitting condition, wherein each of the oscillating signals are phase shifted relative to one another,
   wherein the master controller is operable to:
      provide, during a first period of time, the oscillating signal to each of the plurality of output controllers to oscillate the output power to the corresponding groups of light emitting diodes;
      control, during a second period of time, each of the corresponding groups of light emitting diodes to operate at peak amplitude simultaneously without oscillation; and
      provide, during a third period of time, the oscillating signal to each of the plurality of output controllers to oscillate the output power to the corresponding groups of light emitting diodes.

2. The light system as recited in claim 1, wherein the plurality of power output controllers consists of three controllers, each corresponding to a different color band.

3. The light system as recited in claim 2, wherein a second output from a second of the three controllers is phase shifted relative to a first output from a first of the three controllers and a third output from a third of the three controllers is phase shifted relative to both the first output and a the second output.

4. The light system as recited in claim 3, wherein the phase shift of the second output relative to the first output is 120 degrees.

5. The light system as recited in claim 3, wherein the phase shift of the third output relative to the second output is 120 degrees.

6. The light system as recited in claim 2, wherein the three controllers consist of a first controller, a second controller, and a third controller, and the master controller operable to output data to the first controller, the second controller, and third controller to adjust the corresponding duty cycle of the associated light emitting diodes.

7. The light system as recited in claim 6, wherein the duty cycles are independently adjustable thereby producing a different density of light output.

8. The light system as recited in claim 1, wherein each of the oscillating signals are phase shifted relative to one another to provide a plant with effective amounts of each of the corresponding groups of light emitting diodes while maintaining efficient plant growth and reducing overall power consumption.

9. A lighting system comprising:
   a plurality of light emitting diodes, wherein each of the light emitting diodes is configured to output light in a predetermined color band and is arranged in a corresponding group according to the predetermined color band;
   a plurality of output controllers, each of the plurality of output controllers operable to adjust output power to one of the corresponding groups of light emitting diodes;
   a master controller coupled to the plurality of output controllers and operable to synchronize the plurality of output controllers, wherein the master controller is operable to receive data from a remote device indicating a desired duty cycle, cycle period, and phase shift of the output power relative to one another,
wherein the master controller is operable to provide an oscillating signal to each of the plurality of output controllers to oscillate output power to the corresponding groups of light emitting diodes between a light emitting condition and a non-light emitting condition, wherein each of the oscillating signals are phase shifted relative to one another,
wherein the master controller is operable to:
provide, during a first period of time, the oscillating signal to each of the plurality of output controllers to oscillate the output power to the corresponding groups of light emitting diodes;
control, during a second period of time, each of the corresponding groups of light emitting diodes to operate at peak amplitude simultaneously without oscillation; and
provide, during a third period of time, the oscillating signal to each of the plurality of output controllers to oscillate the output power to the corresponding groups of light emitting diodes.

10. The lighting system of claim 9, wherein each of the oscillating signals are phase shifted relative to one another to provide a plant with effective amounts of each of the corresponding groups of light emitting diodes while maintaining efficient plant growth and reducing overall power consumption.

11. The light system as recited in claim 9, wherein the plurality of power output controllers consists of three controllers, each corresponding to a different color band.

12. The light system as recited in claim 11, wherein a second output from a second of the three controllers is phase shifted relative to a first output from a first of the three controllers and a third output from a third of the three controllers is phase shifted relative to both the first output and the second output.

13. The light system as recited in claim 12, wherein the phase shift of the second output relative to the first output is 120 degrees.

14. The light system as recited in claim 12, wherein the phase shift of the third output relative to the second output is 120 degrees.

15. The light system as recited in claim 12, wherein the phase shift of the second output relative to the first output is 120 degrees and the phase shift of the third output relative to the second output is 120 degrees.

16. The light system as recited in claim 11, wherein the three controllers consist of a first controller, a second controller, and a third controller, and the master controller operable to output data to the first controller, the second controller, and third controller to adjust the corresponding duty cycle of the associated light emitting diodes.

17. The light system as recited in claim 16, wherein the duty cycles are independently adjustable thereby producing a different density of light output.

18. The light system as recited in claim 9, wherein the master controller is operably coupled to a plant input unit that contains data regarding the plants that are being illuminated by the light system, wherein the plant input unit is operable to communicate with the master controller to adjust the duty cycle, cycle period, and/or phase shift of the corresponding groups of light emitting diodes to optimize plant growth.

19. The light system as recited in claim 18, wherein the plant input unit is operable to store data regarding profiles for a plurality of plants.

20. The light system as recited in claim 19, wherein the profiles have data concerning timing, duty cycle or light density of the plurality of light emitting diodes, phase shifting of plurality of light emitting diodes, and cycle period of the plurality of light emitting diodes.

* * * * *